United States Patent
Suzuki et al.

(10) Patent No.: US 7,295,701 B2
(45) Date of Patent: Nov. 13, 2007

(54) METHODS AND SYSTEMS FOR EFFICIENTLY PROCESSING IMAGE DATA FOR REPRODUCTION

(75) Inventors: Kiyoshi Suzuki, Tokyo (JP); Noboru Murayama, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 472 days.

(21) Appl. No.: 10/719,963

(22) Filed: Nov. 21, 2003

(65) Prior Publication Data

US 2004/0076326 A1    Apr. 22, 2004

Related U.S. Application Data

(63) Continuation of application No. 08/709,517, filed on Sep. 6, 1996, now abandoned.

(30) Foreign Application Priority Data

Sep. 6, 1995    (JP) .................................. 7-229524

(51) Int. Cl.
    G06K 9/00    (2006.01)
(52) U.S. Cl. ...................... 382/162; 382/166; 382/167; 382/252
(58) Field of Classification Search ................ 382/162, 382/166, 167, 252, 274, 282, 296; 358/538, 358/519–521, 523, 539, 451, 453, 461, 462, 358/3.06, 3.13
    See application file for complete search history.

(56) References Cited

U.S. PATENT DOCUMENTS

| | | | |
|---|---|---|---|
| 4,803,558 A * | 2/1989 | Hiratsuka et al. ........... 358/451 |
| 5,121,446 A | 6/1992 | Yamada et al. |
| 5,159,470 A | 10/1992 | Ishida et al. |
| 5,164,717 A | 11/1992 | Wells et al. |
| 5,204,665 A | 4/1993 | Bollman et al. |
| 5,204,753 A | 4/1993 | Tai |
| 5,208,871 A * | 5/1993 | Eschbach ..................... 382/252 |
| 5,243,441 A * | 9/1993 | Kawata ....................... 358/451 |
| 5,301,271 A | 4/1994 | Hiratsuka et al. |
| 5,339,171 A | 8/1994 | Fujisawa et al. |
| 5,384,646 A * | 1/1995 | Godshalk et al. ........... 358/448 |
| 5,519,509 A * | 5/1996 | Hikosaka et al. .......... 358/3.03 |
| 5,521,989 A * | 5/1996 | Fan ............................ 382/270 |

(Continued)

FOREIGN PATENT DOCUMENTS

JP    2-210963    8/1990

(Continued)

OTHER PUBLICATIONS

Tetsuya Itoh, "The Prospects of Image Quality Development on Digital Electrophotographic Imaging," Japanese Photography Academy, vol. 57, 1994, pp. 99, 103 and 107. (See English Abstract, particularly Fig. 10.).

(Continued)

*Primary Examiner*—Phuoc Tran
(74) *Attorney, Agent, or Firm*—Knoble Yoshida & Dunleavy, LLC

(57) ABSTRACT

The methods and systems according to the current invention allow the use of slower and inexpensive image-processing components by approximating or compressing color image data prior to image processing such as enlarging, reducing and cutting an original image without sacrificing the output image quality or overall reproduction speed.

18 Claims, 13 Drawing Sheets

U.S. PATENT DOCUMENTS 5,724,450 A    3/1998  Chen et al.

FOREIGN PATENT DOCUMENTS

| JP | 05-056263 | 3/1993 |
|----|-----------|--------|
| JP | 05-328136 | 12/1993 |
| JP | 6-98157 | 4/1994 |
| JP | 06-178107 | 6/1994 |
| JP | 07-030772 | 1/1995 |

OTHER PUBLICATIONS

Floyd, et al., "An Adaptive Algorithm for Spatial Greyscale," Proceedings of the S.I.D., vol. 17/2, Second Quarter, 1976, pp. 75-77.

* cited by examiner

FIG. 8A
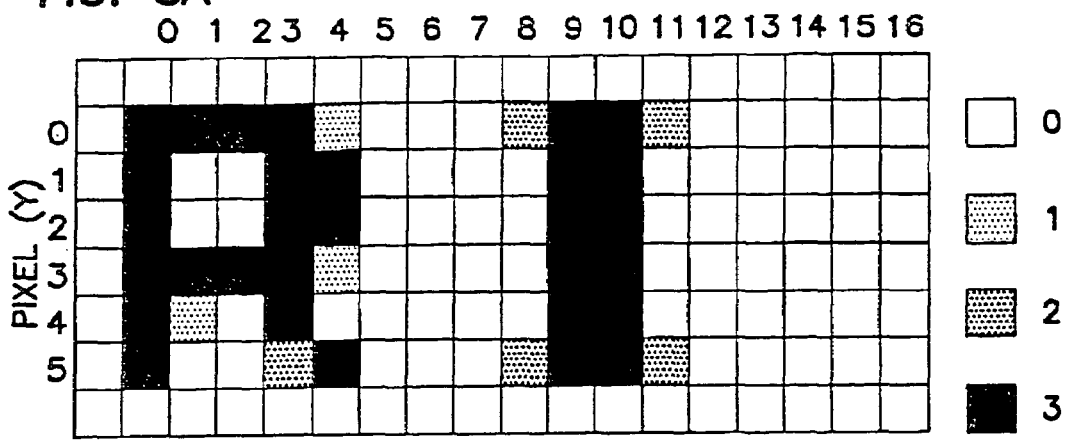
FIG. 8B
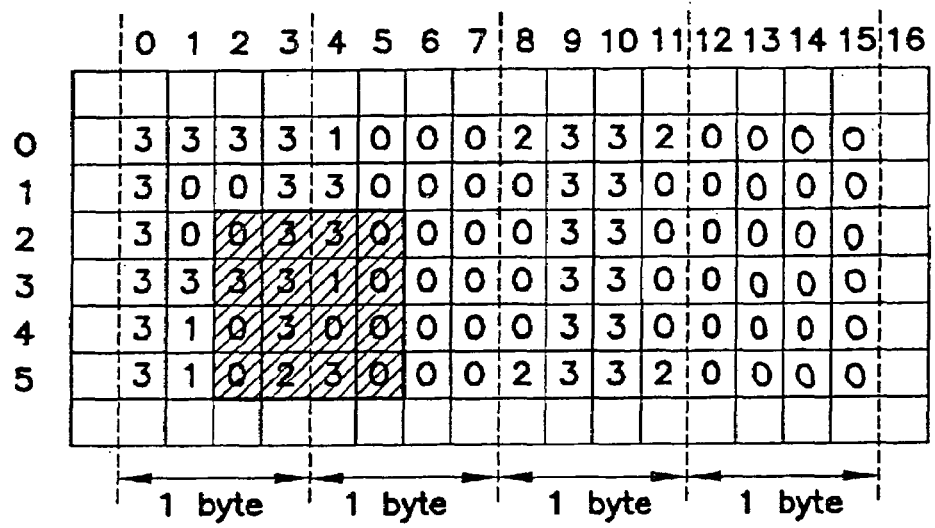
FIG. 8C
| 0 | 3 | 3 | 0 |
|---|---|---|---|
| 3 | 3 | 1 | 0 |
| 3 | 3 | 0 | 0 |
| 0 | 2 | 3 | 0 |
FIG. 8D
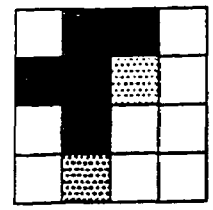

| INPUT | OUTPUT |
|-------|--------|
| 0 | 0 |
| 1 | 10 |
| 2 | 35 |
| 3 | 99 |

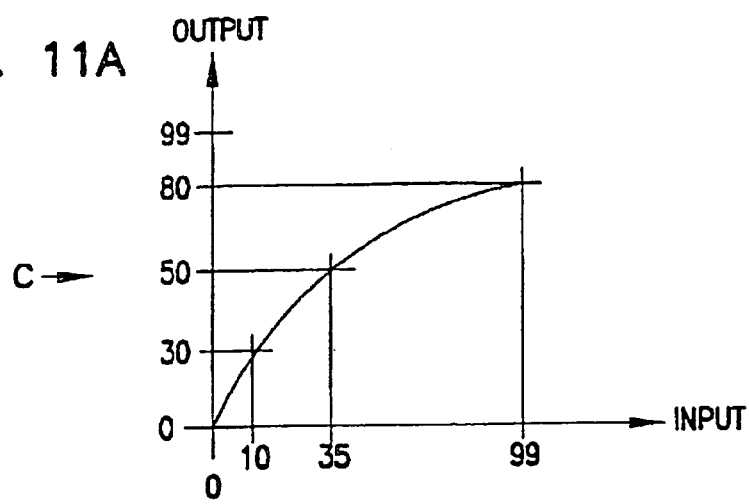
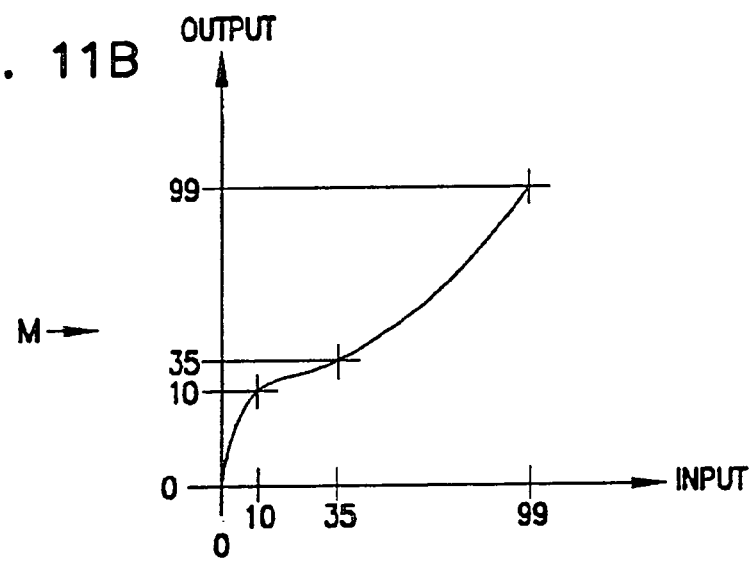
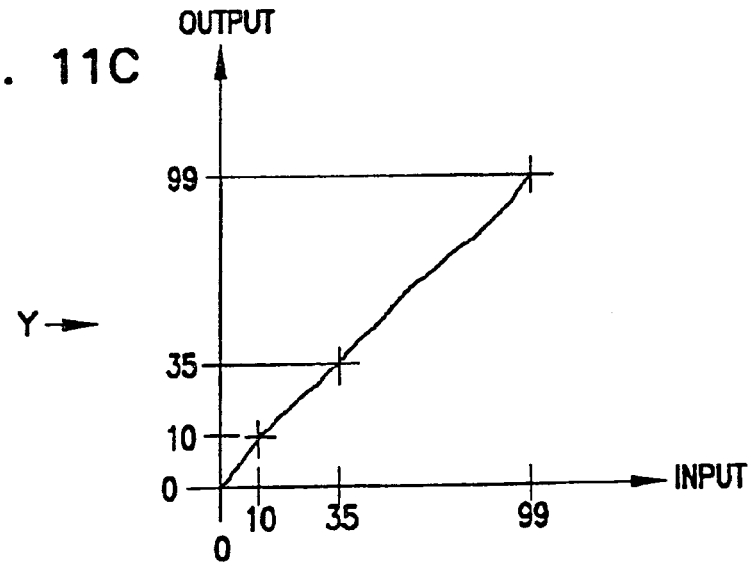

| INPUT | OUTPUT | | | |
|---|---|---|---|---|
| | C | M | Y | K |
| 0 | 0 | 0 | 0 | 0 |
| 10 | 30 | 35 | 10 | 10 |
| 35 | 50 | 40 | 35 | 20 |
| 99 | 80 | 99 | 99 | 99 |

| INPUT (4 VALUES) | OUTPUT | | | |
|---|---|---|---|---|
| | C | M | Y | K |
| 0 | 0 | 0 | 0 | 0 |
| 1 | 30 | 35 | 10 | 10 |
| 2 | 50 | 40 | 35 | 20 |
| 3 | 80 | 99 | 99 | 99 |

FIG. 13

| | CONVENTIONAL APPARATUS | | | PREFERRED EMBODIMENT |
|---|---|---|---|---|
| | NO COMPRESSION | COMPRESSION JUST PRIOR TO OUTPUT | VARIABLE COMPRESSION PROCESS | FIXED COMPRESSION UNIT |
| DATA PROCESSING AMOUNT | | 62 MB | N/A | 15.5 MB |
| DATA PROCESSING SPEED | | 10.3 MB/sec | N/A | 2.58 MB/sec |
| IMAGE PROCESSING | | POSSIBLE | N/A | POSSIBLE |
| DECOMPRESSION | | NOT POSSIBLE | NECESSARY | NOT NECESSARY |
| OUTPUT STABILITY | LIKELY TO BE UNSTABLE | STABLE | LIKELY TO BE UNSTABLE | STABLE |
| GRADATION | STANDARD | SUPERIOR | DEPENDING ON COMPRESSION METHOD | SUPERIOR |
| RESOLUTION | 400 dpi | 400 dpi | DEPENDING ON COMPRESSION METHOD (<400 dpi) | 400 dpi |

METHODS AND SYSTEMS FOR EFFICIENTLY PROCESSING IMAGE DATA FOR REPRODUCTION

This is a continuation of prior application Ser. No. 08/709,517 filed on Sep. 6, 1996 under 35 CFR 1.53(b), now abandoned.

FIELD OF THE INVENTION

The current invention is generally related to methods of and systems for image reproduction, and more particularly related to the methods of and the systems for approximating or compressing color data prior to color image processing in order to efficiently reproduce an original color image.

BACKGROUND OF THE INVENTION

In a digital color copier, various components perform a series of processes in order to reproduce an original image as shown in FIG. 1. In general, the processes initially involve scanning an original image 1 in red, green and blue (RGB) values in an analog format via an optical scanner unit 2. An analog-to-digital (A/D) converter 3 converts the scanned analog signal into digital signal. Since each scanner 2 has its own input characteristics, a scanner correction unit 4 corrects the digits data according to the input characteristics. For the output purpose, the corrected digital signal is converted into cyan, magenta, yellow, and black (CMYK) signals by a color conversion unit 5. An image processing unit 6 further processes the CMYK signals. For example, the image processing involves enlargement, reduction and cutting a certain portion of the image. Prior to outputting an image, an intensity gamma correction unit corrects the intensity level according to the output characteristics of an output unit 9. Similarly, a chromaticity gamma correction unit 8 also corrects the chromaticity values according to the output characteristics of the output unit 9 prior to outputting an image.

In the above described digital reproduction processes, an amount of color information is an important factor in determining the speed of each process. For example, assuming that each pixel is represented by 32-bit data for the CMYK value (8-bit for each color component C, M, Y or K), at 400 dpi, the total amount of data representing an image on A-4 size paper is approximately 62 mega bytes (MB). In order to reproduce ten pages of A-4 color image per minute (10 ppm) 10.3 MB of information must be processed each second. In other words, referring back to FIG. 1, the units such as the image processing unit 6 must be able to process information faster than at least 10.3 MB/sec. In general, because of the above required high performance, certain crucial processing components are costly and cannot be replaced with less expensive slow units.

One approach to use the slow processing components is to reduce an amount of data by conventional data compression techniques. In general, the conventional data compression techniques are used to reduce the amount of data poor to storing in a storage device so that the storage space is saved. In another area of applications, the conventional data compression techniques are useful to reduce the data size prior to transmitting the data in order to the save transmission line capacity. However, since the compressed data generally contains less than original information, the compressed data needs to be restored to the original uncompressed data via a decompression process before the data is image processed. In other words, the compressed data is not usually suitable for image processing such as enlargement and reduction. For this reason, the conventional compression techniques are not particularly useful for efficiently processing image data.

Another approach in reducing the data size is approximation of the original data. Since the ability of humans to differentiate the gradation values rapidly decreases as the resolution of the output image increases, at a high resolution, the gradation appears indistinguishable to human eyes. P. G. Loetling, visual Performance and Image Coding, SPIE/OSA, Image Processing 74 (1976). The input color data is approximated by a fixed reduction rate using an error diffusion method or a dithering method. For example, Japanese Patent applications 2-210963 and 6-98157 disclose improved error diffusion techniques. However, these approximation techniques are applied to approximate the input data only for the purpose of outputting the input image.

As described above, there has been a need for efficiently image processing a large amount of information such as color image data without relying upon expensive high-speed processing components without sacrificing the reproduction speed and reproduced image quality. In the alternative, there has been also a need for improving the processing speed without requiring a higher-speed image processing components.

SUMMARY OF THE INVENTION

To solve the above and other problems, according to the current invention, an image processing apparatus, including: a reader module for inputting original image data including a pixel color value for each pixel represented by a first predetermined number of n bits in an original image, the reader module approximating the pixel color value into a second predetermined number of m bits while performing error diffusion so as to generate approximated color image data, the m bits being smaller than the n bits; a variable length encoder unit connected to the reader module for variably compressing the approximated color image data to generate further approximated color image data before transmitting the further approximated color image data; a variable length decoder unit connected to the variable length encoder for variably decompressing the further approximated color image data back to the approximated color image data so that each pixel is represented by the m bits; and an image processing/reproduction module connected to the variable length decoder for processing the approximated color image data for performing a combination of image processing, intensity correction and color correction so as to generate processed approximated color image data, the image procexxing/reproduction module outputting a reproduced image based upon the processed approximated color image data.

According to a second aspect of the current invention, a method of image processing, including the steps of: inputting original image data including a pixel color value for each pixel represented by a first predetermined number of n bits in an original image; approximating the pixel color value into a second predetermined number of m bits while performing error diffusion so as to generate approximated color image data, the m bits being smaller than the n bits; variably compressing the approximated color image data to generate further approximated color image data before transmitting the further approximated color image data; transmitting the further approximated color image data from a first location to a second location; receiving the further aproximated color image data at the second location; variably decompressing the further approximated color image data back to the approximated color image data so that each pixel is represented by the m bits; processing the approximated color image data for performing a combination of image processing, intensity correction and color correction so as to generate processed approximated color image data; and outputting a reproduced image based upon the processed approximated color image data.

According to a third aspect of the current invention, an image processing system, including: a transmission side including; a reader module for inputting original image data including a pixel color value for each pixel represented by a first predetermined number of n bits in an original image, the reader module approximating the pixel color value into a second predetermined number of m bits while performing error diffusion so as to generate approximated color image data, the m bits being smaller than the n bits; a variable length encoder unit connected to the reader module for variably compressing the approximated color image data to generate further approximated color image data before transmitting the further approximated color iamge ddata; and a reception side operationally connected to the transmission side including; a variable length decoder unit for variably decompressing the further approximated color image data back to the approximated color image data so that each pixel is represented by the m bits; and an image processing/reproduction module operationally connected to the variable length decoder unit for processing the approximated color image data for performing a combination of image processing, intensity correction and color correction so as to generate processed approximated color image data, said image processing/reproduction module outputting a reproduced image based upon the processed approximated color image data.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 8A, 8B, 8C and 8D respectively illustrate an example of a compressed image data representation, the corresponding compressed numerical representation, an example of a cut-out section in the numerical representation, and the cut-out section in the corresponding image representation.

FIGS. 11A, 11B, 11C and 11D respectively indicate one exemplary conversion function for each color component C, M, Y and K or while 11E indicates one exemplary table of conversion values for an output device.

FIG. 12 is an alternative conversion/decompression table for the processed compressed values prior to inputting to an output device.

FIG. 13 is a summary table comparing features of a conventional digital color copier and those of a preferred embodiment according to the current invention.

DETAILED DESCRIPTION OF THE PREFERRED EMBODIMENT(S)

Figure 1:
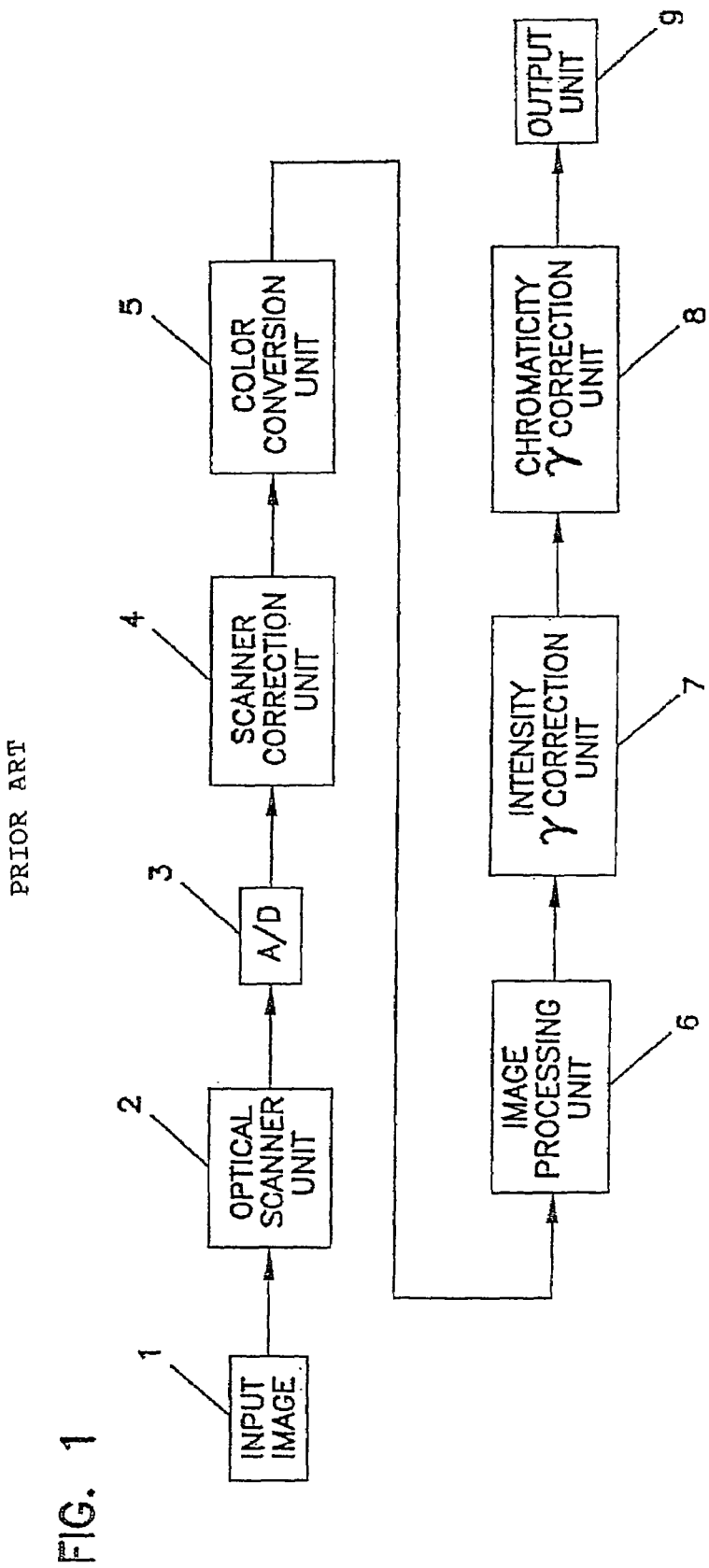
FIG. 1 is a block diagram illustrating components performing steps involved in conventional digital copying.
Figure 2:
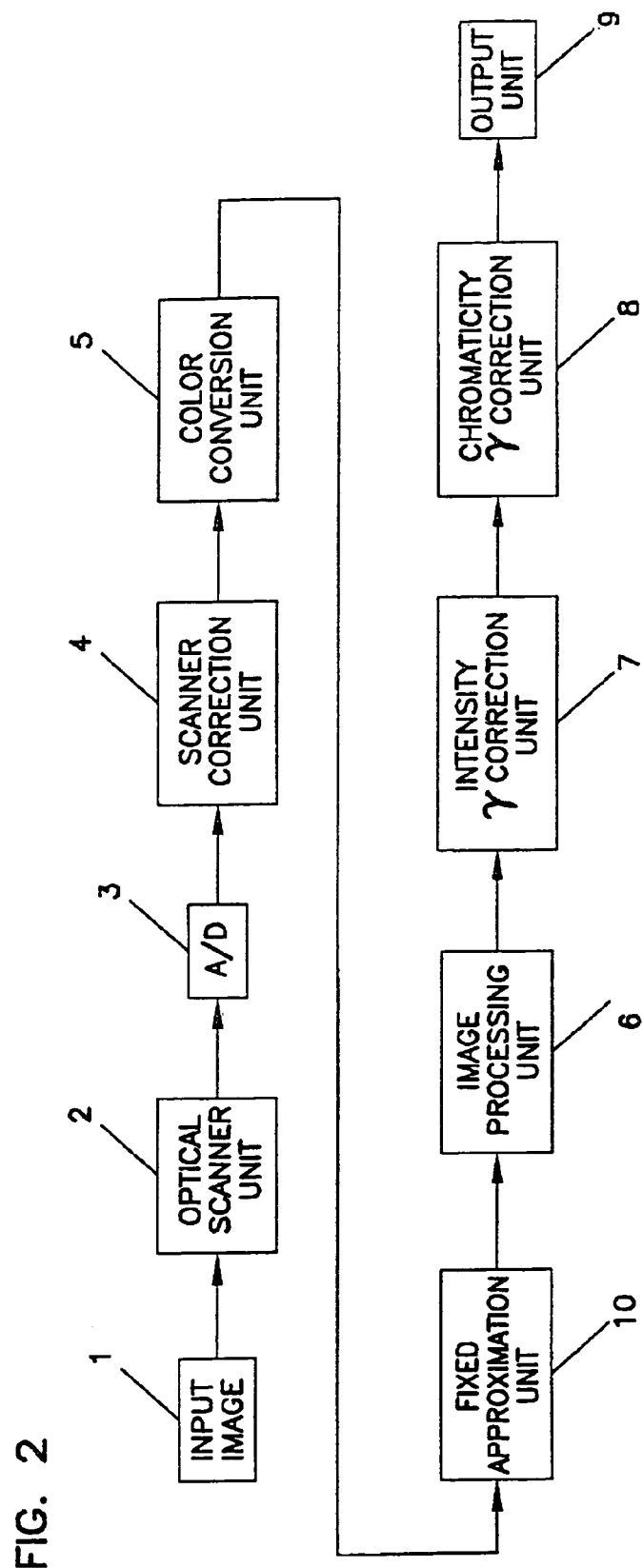
FIG. 2 is a block diagram illustrating components performing steps involved in digital copying according to the current invention.

Referring now to the drawings, wherein like reference numerals designate corresponding structure throughout the views, and referring in particular to FIG. 2, according to one preferred embodiment of the current invention, an optical scanner 2 scans an original image 1 in red, green and blue (RGB) values in an analog. An analog-to-digital (A/D) converter 3 converts the scanned analog signal into digital signal. Since each scanner 2 has its own input characteristics, a scanner correction unit 4 corrects the digital data according to the input characteristics. For the output purpose, the corrected digital signal is converted into cyan, magenta, yellow, and black (CMYK) signals by a color conversion unit 5. Before an image processing unit 6 further processes the CMYK signals, an approximation unit 10 approximates the CMYK signals by a smaller size of image information based upon a predetermined method such as an weighted error diffusion method and a fixed ratio length compression. According to alternative embodiment of the current invention, a compression unit is used in place of the approximation unit 10. Then, the image processing unit 6 further processes the approximated or compressed CMYK signals by performing a process such as enlargement, reduction and cutting a certain portion of the image. Prior to outputting an image, an intensity gamma correction unit corrects the intensity level according to the output characteristics of an output unit 9. Similarly, a chromaticity gamma correction unit 8 also corrects the chromaticity values according to the output characteristics of the output unit 9 prior to outputting an image.

Still referring to FIG. 2, one preferred embodiment of the approximation unit 10 according to the current invention approximates two hundred fifty-six gradations or colors by four gradations or colors. The numbers ranging between 0 and 255 require 8 bits of information while the numbers ranging between 0 and 3 require only 2 bits. Since each of the color components such as C, M, Y and K is individually approximated for each pixel, 24 bits are saved per pixel. The above described approximation is also known as quaternarization. In order to quaternarize the original 8-bit density or color information, a fixed rate approximation such as a dithering or error diffusion method is used. As a result of approximation, the 8-bit data is essentially compressed into 2-bit data. However, as later will be described, the meaning of the term "compressed" according to the current invention is distinct from the conventional data compression technique.

The approximated data is used for the additional processes prior to reproduce a processed original image. The image-processing unit 6 takes advantage of quaternary data which requires less processing than the original 8-bit data for the identical editing tasks such as enlargement, reduction and cutting of the original image. Because of the compressed data, the image-processing unit 6 is implemented with an inexpensive components and meets the operational speed requirement. In the alternative, the image processing unit 6 with high-performance components increases the processing speed. Similarly, the intensity gamma correction unit 7 and the chromaticity gamma correction unit 8 both use the quaternary data for their efficient processing. The approximated data is prepared prior to outputting a reproduced image via the outputting unit 9.

The outputting unit 9 receives the processed approximated data according to the current invention and generally outputs an image with improved quality without sacrificing resolution. Outputting devices such as printers, digital copiers, facsimile machines outputs an image based upon a unit dot. For example, a printer with 400 DPI and 256 gradations is designed to output an image based upon 400 dots per inch (DPI) and ½₅₅th of one dot as a unit of gradation.

However, because the unit of control under the 256-gradation scheme is too small to output, the output is often inconsistent. Even though the output data specifies the 8 bit information or 256-gradation values, the output devices are often not sufficiently stable to generate the full range of the 256 gradations. Consequently, the output image is not reliably reproduced. In contrast to the above described unreliable output scheme, the quaternary data has only four gradations such as 0, 1, 2 and 3 as stored in two-bit information. These two-bit information is later converted or translated into four eight-bit values such as 0, 85, 170 and 255. Thus, the output is stable and the quaternarized gradation appears superior to that reproduced under the 256-gradation scheme.

Furthermore, in order to compensate for the lack of capability of expression 256 gradations per dot, in certain printers, a plurality of dots is used as a unit for one pixel. As a result, the resolution of an output image is undesirably decreased. In contrast, the resolution of the output image is not affected under the quaternary system. Since only four values such as 0, 1, 2 and 3 need to be differentiated in the output of each dot, the dots do not have to be combined and the resolution remains the same under the quaternary system. In conclusion, when output devices such as printers are not capable of generating the same number of gradations as an original input image, the preferred embodiment provides a superior results without sacrificing resolution.

Figure 3A:
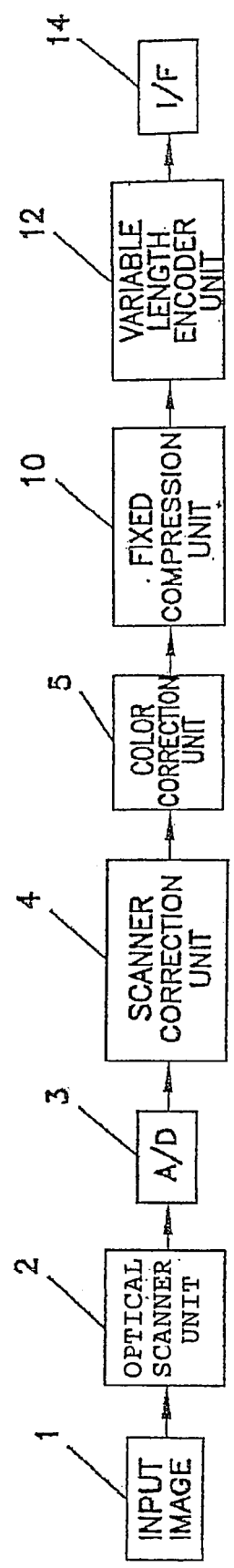
FIGS. 3A and 3B are block diagrams illustrating components performing steps involved in digital copying with compressed data transmission according to the current invention.
Figure 3B:
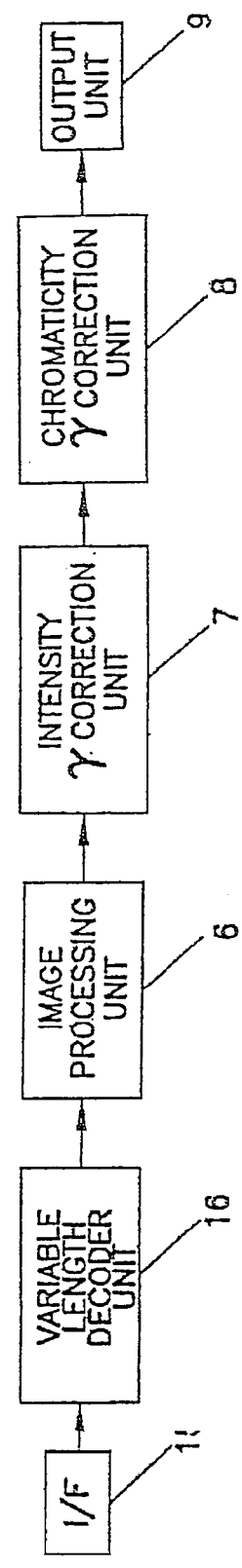

Referring to FIGS. 3A and 3B, a second preferred embodiment according to the current invention is generally similar to the above described first preferred embodiment. However, the second preferred embodiment is modularized into a reader module as shown in FIG. 3A and an image processing/reproduction module as shown in FIG. 3B. These modules are interfaced by interfaced units 14 and 15.

Referring to FIGS. 3A and 3B, a second preferred embodiment according to the current invention is generally similar to the above described first preferred embodiment. However, the second preferred embodiment is modularized into a reader module as shown in FIG. 3A and an image processing/reproduction module as shown in FIG. 3B. These modules are interfaced by interfaced units 14 and 15. Furthermore, the second preferred embodiment additionally includes a variable length encoder units 12 and a variable length decoder 16. After the color image information is similarly processed in the reader module by the units 15 as described with reference to FIG. 2, the fixed compression unit 10' compresses the size of the CMYK color data by approximation. The variable length encoder unit 12 further compresses the 2-bit data size based upon a predetermined variable length compress technique such as bit plane JBIG coding. The reduced-size data is then sent from the reader module to the image processing/reproduction module via a first interface unit 14 to a second interface unit 15. In the image processing module, a second variable length decoder unit 16 restores the reduced data size back to fixed 2-bit data. The processing units 6-8 process the 2-bit data as described with respect to FIG. 2 before an output unit 9 outputs an image.

Figure 4A:
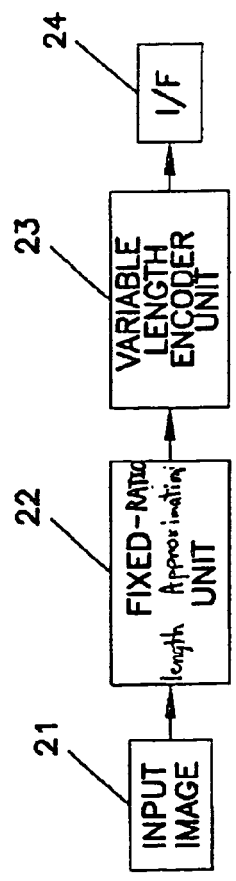
FIGS. 4A and 4B illustrate an alternative embodiment according to the current invention in which the compressed data is transmitted to a second location before the compressed data is image processed.
Figure 4B:
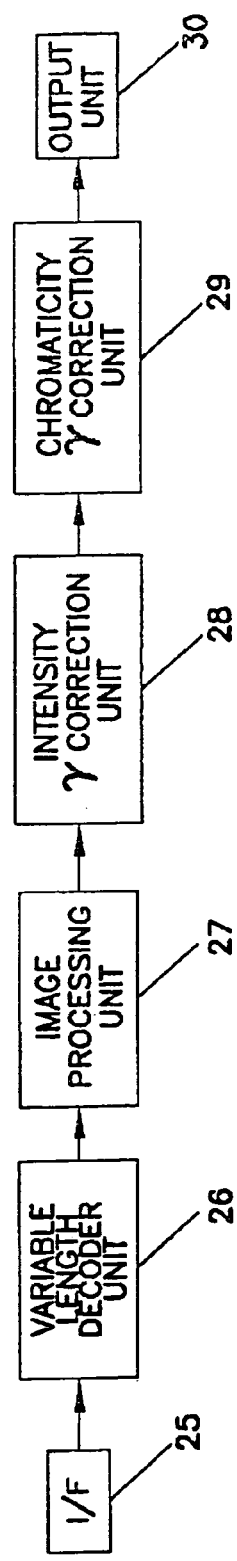

Referring to FIGS. 4A and 4B, a third preferred embodiment according to the current invention is generally similar to the above described second preferred embodiment. However, the third preferred embodiment is suitable for efficiently transmitting data from one location to another. After image information is compressed to 2-bit information by a fixed-ratio length compression unit 22 and further compressed by a variable length encoder unit 23, the reduced size data is transmitted through a transmission line via a transmitting interface unit 24. A receiving interface 25 receives the transmitted data, and a second variable length decoder unit 26 restores the reduced data size back to 2-bit data. The image-processing units 27, an intensity gamma correction unit 28 and a chromaticity gamma correction unit 29 process the 2-bit data as described with respect to FIG. 2 before an output unit 30 outputs an image. The above described third preferred embodiment thus promotes not only the efficiency of the image processing tasks but also the efficiency of the transmission line by saving its capacity.

In the above approximation unit or compression unit, a weighted error diffusion process is performed on the original image data, and the error diffused data is subsequently approximated. In general, one weighted error diffusion technique accumulates the weighted error of each pixel between its original input value and its output value from the surrounding pixels. Because the output values of the error diffusion are limited to four values, the errors between the input values and the output values are weighted according to a predetermined set of weights, and the weighted errors are distributed among the neighboring pixels so as to keep the average gradation equal to the original gradation. In other words, the average error is tantamount to zero. The predetermined weights are determined used upon the distance between the current pixel and the surrounding pixel and modified by experimentations.

In the above described error diffusion method, a set of weight values or parameters plays an important role in designing hardware and software. For the efficient software and hardware design, each weight parameter value is the n-th power of ½ or 2 where n is an integer or the summation of the n-th power of ½ or 2 where n is an integer. In addition, the sum of the above described individual weight parameter values must be $2^n$ where n is an integer. The above described weight parameters increase the error diffusion processing speed since the binary processor requires only shift operations. At the same time, the above described weight values reduce the hardware cost since they do not need an expensive math-coprocessor.

The above described weight values also play an important role in determining the aesthetic appearance of a printed image. The human perception of the error diffused image is termed as texture. Certain weight values used during the above described error diffusion process lead to an undesirably textured print image. The weight values as shown in FIG. 5B are experimentally determined to substantially minimize the undesirable texture while optimizing the above described processing efficiency.

Figure 5A:
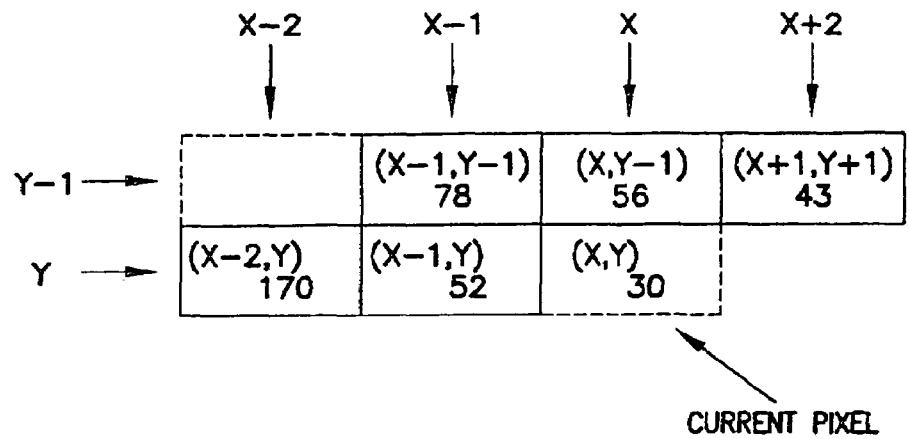
FIGS. 5A and 5B respectively illustrate tables respectively containing exemplary values and the corresponding weight values.
Figure 5B:
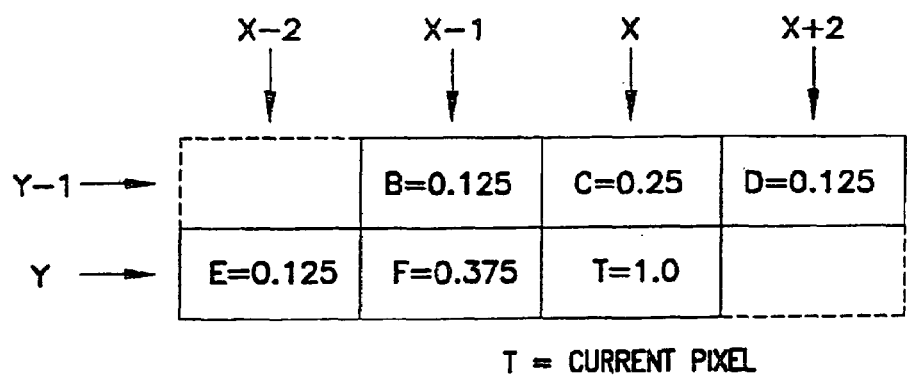

Referring specifically to FIG. 5A, pixels are processed from left to right and from top to bottom. The current unprocessed pixel is designated by (x,y). An original input value of the current pixel is 30. Surrounding pixels are designated by (x−1, y−1) through (x−1,y), and they have been already processed for error diffusion. The values in these error diffused pixels respectively indicate a residual difference value. To ultimately determine the residual difference value of the current pixel, a sum of the product between a weight ($w_i$) and a residual difference value ($rd_i$) is divided by the sum of the weight values (i), and the quotient is added to the current pixel input value (cp). In general, the above described relation is expressed by the following equation:

$$wed_{n+1} = cp + \Sigma(rd_i \cdot w_i)/\Sigma w_i$$

where $wed_{n+1}$ is a weighted error diffusion value for the current pixel. The summation is taken for i from 1 to n and n is the predetermined number of processed surrounding pixels.

To illustrate the above described determination of the weighted error diffusion value, referring to FIG. 5B, the weight values are provided for each surrounding pixel having the residual difference values as shown in FIG. 5A. Applying these values to the above described equation, the weighted error diffusion value for the current pixel is determined as follows:

$$30 + (78 \cdot 0.125 + 56 \cdot 0.25 + 43 \cdot 0.125 + 170 \cdot 0.125 + 52 \cdot 0.375)/1 \approx 100$$

The notice that the sum of the above weights is determined to be one for convenience. The error diffusion value is now approximated before the residual difference value is determined for the current pixel.

Figure 6A:
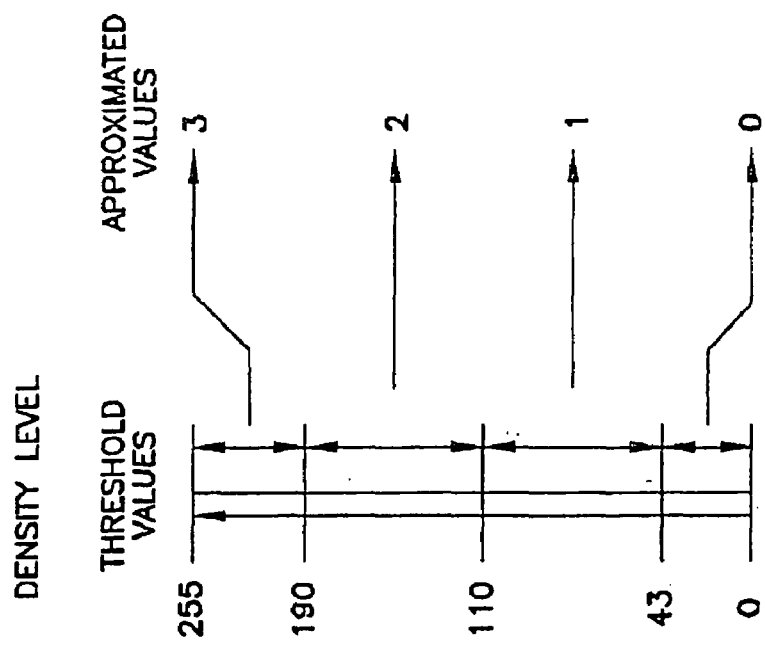
FIGS. 6A and 6B illustrate examples of thresholds values used in the compression of 8-bit data into 2-bit data.

To illustrate the approximation process, the above determined weighed error diffusion value for the current pixel is used to obtain final 2-bit information. Referring to FIG. 6A, one preferred process of the quaternarization process according to the current invention approximates the weighted input values by n approximated values. The range k is less than the range of the input values. According to one preferred quaternarization method, the weighted error diffused input values range from 0 to 255 while the approximated values range from 0 to 3. In other words, 8-bit information is approximated by 2-bit information, and the data size is compressed. In approximating into the four values, each weighted error diffusion value is compared against a set of predetermined threshold values to determine an approximated value. Referring to FIG. 6A, one set of exemplary predetermined threshold values includes 43, 128 and 213. Any input values fall in a range between 0 and 43 is approximated by a quaternary value 0. Similarly, the second range is defined by thresholds 43 and 128 and assigned a quaternary value 1. Lastly, the third range is between the thresholds 128 and 213 while the fourth range is between 213 and 255. The third and fourth ranges are respectively assigned a quaternary value of 3 and 4. Thus, the current pixel error diffusion value 100 is falls between the two thresholds between 43 and 128 and is approximated by 1 according to this exemplary threshold values.

To further illustrate the determination of the residual difference value of the above described current pixel, still referring to FIG. 6A, the weighted error diffusion value is compared to a certain standard value referenced by the approximated value. According to one preferred embodiment, the standard value is determined to be the nearest threshold value of three equally divided ranges. In other words, the value one in the quaternary system corresponds to 85 in the 256 gradation scale. Since the error diffusion value "100" is approximated by one in the quaternary system, a residual difference value of "15" exists when "85" is outputted in the 256-gradation scale. The above newly determined residual difference value is now used for the next cycle in determining the error diffusion value for a new current pixel (x+1, y).

Figure 6B:
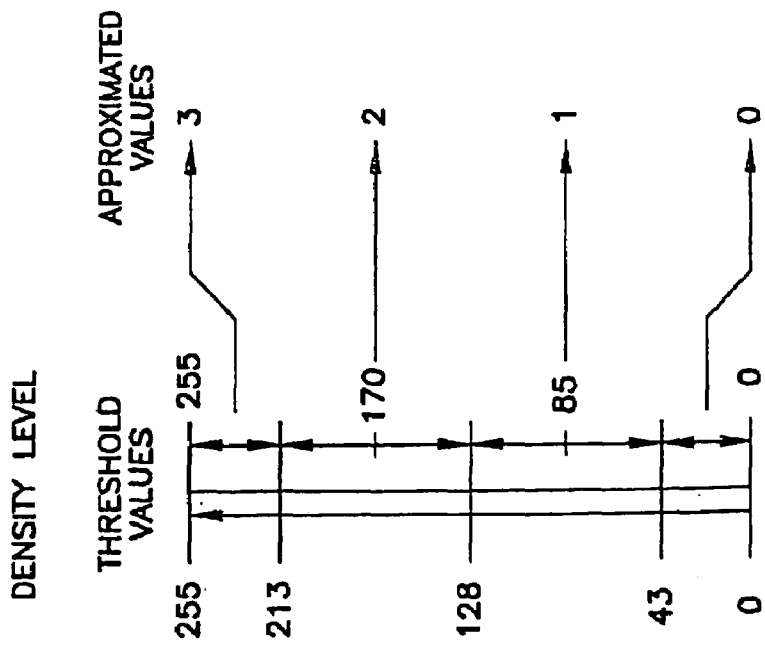

Referring to FIG. 6B, another set of exemplary threshold values for the quaternary system includes 43, 110 and 190 for approximating the input values ranging from 0 to 255. Unlike the threshold values as shown in FIG. 6A, each of the divided ranges is different in size in the 256-gradation scale.

Figure 7A:
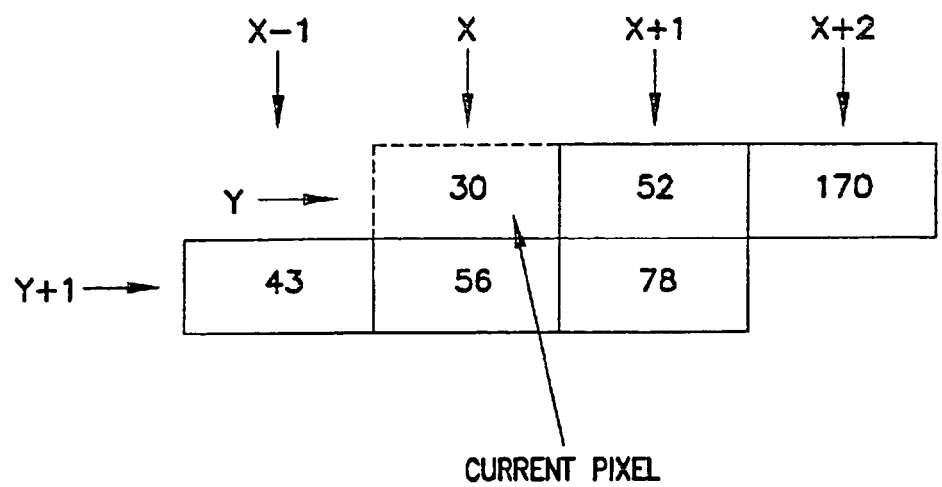
FIGS. 7A and 7B respectively illustrate another example pair of tables containing exemplary values and the corresponding weight values.
Figure 7B:
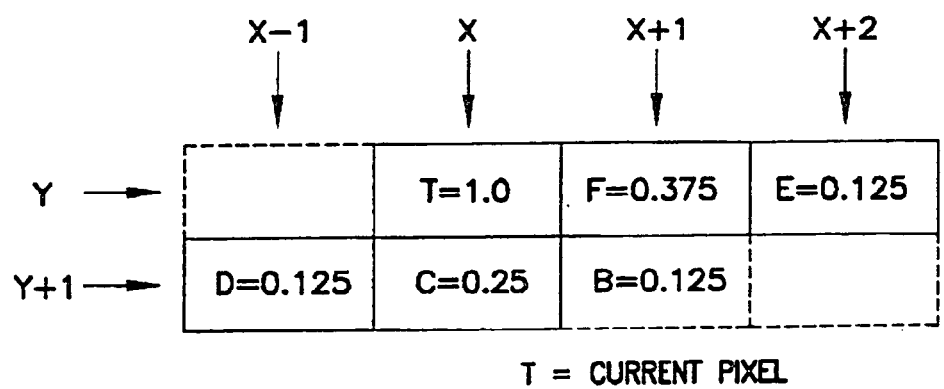

Referring to FIGS. 7A and 7B, a second preferred process of the error diffusion is to distribute the weighted error to the surrounding pixels rather than to accumulate them from the surrounding pixel. Turning to FIG. 7A, if the current pixel 30 at (x,y) is approximated based upon the thresholds as shown in FIG. 6A, since 30 falls between the two threshold vales 0 and 43, 30 in the 256 gradation scale is approximated by 0 in the quaternary scale. Thus, the above described residual difference is 30. The residual difference is now distributed to surrounding pixels based upon the corresponding weights as shown in FIG. 7B. The sum of the weights is one to distribute the entire value of the residual difference.

Among the five surrounding pixels from a pixel at (x+1, y) to a pixel at (x+1, y+1), the residual difference value 30 is distributed as follows:

(x+1, y): 52+30·0.375≈63

(x+2, y): 170+30·0.125≈174

(x−1, y+1): 43+30·0.125≈47

(x, y+1): 56+30·0.25≈64

(x+1, y+1): 78+30·0.125≈82

After the above described approximation process is completed, referring to FIGS. 8A-D, the approximated image data is efficiently image-processed according to the current invention. The image processing tasks involve enlargement, reduction and selection of a certain portion of the image. In the following, the image selection process is illustrated using an image represented by the quaternarized density values. As described before, the quaternarized density values range from 0 to 3 and respectively indicated by the corresponding shade as shown in FIG. 8A. FIG. 8B shows the same image as FIG. 8A in the approximated data values.

Furthermore, FIG. 8B also illustrates a selected area to be cut out from the image as indicated by a shaded area. The desired area after the cutting process is illustrated in approximated data as shown in FIG. 8C as well as in image as shown in FIG. 8D.

Figure 9A:
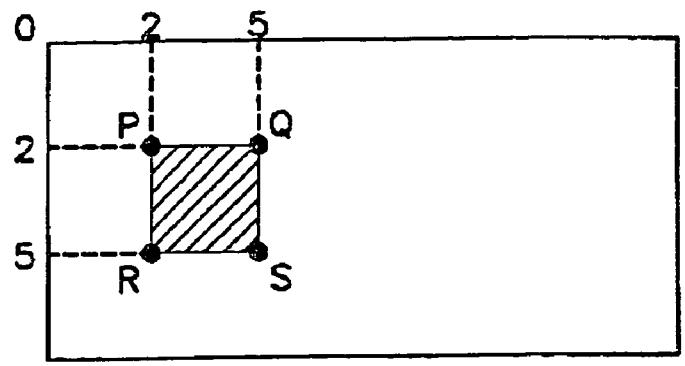
FIGS. 9A and 9B illustrate a process performed upon the cut-out area as described in FIGS. 8.
Figure 9B:
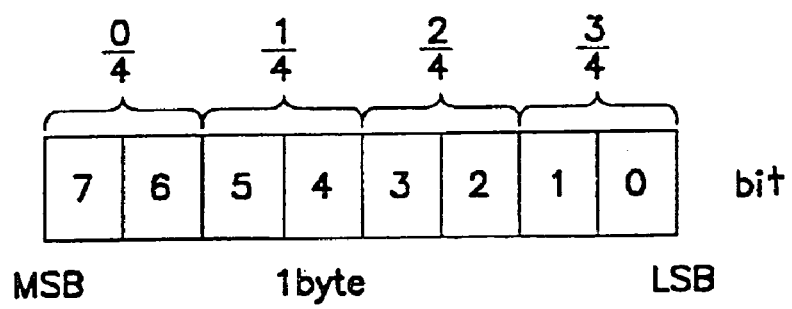

Referring to FIGS. 9A and 9B, in order to isolate a desired portion of the image based upon the above described cutting process, the address of the beginning and end of each horizontal line must be determined. In the first horizontal line of the desired portion, the beginning address is designated by P while the ending address is designated by Q. Both P and Q in the following illustration are relative address with respect to the upper left corner of the image from which the desired portion is to be extracted. Referring back to FIG. 8A, the width of the image is assumed to be 16 pixels indexed from 0 to 15. Since each pixel is approximated by 2-bit quaternarized data, each byte of information has four pixels.

In order to determine the relative addresses P and Q in terms of the number of bytes, the following equation is used:

$P=$(the width of the image)$\times$(the $y$ coordinate of $P$)$\times\frac{1}{4}+$(the $x$ coordinate of $P$)$\times\frac{1}{4}$ $Q=$(the width of the image)$\cdot$(the $y$ coordinate of $Q$)$\cdot\frac{1}{4}+$(the $x$ coordinate of $Q$)$\cdot\frac{1}{4}$ Applying the P=(2,2) and Q=(5,2) to the above equations, the following number of bytes is obtained as offset address:

$P = 16 \cdot 2 \cdot \frac{1}{4} + 2 \cdot \frac{1}{4} = 8 + \frac{1}{2}$ $Q = 16 \cdot 2 \cdot \frac{1}{4} + 5 \cdot \frac{1}{4} = 9 + \frac{1}{4}$ The starting address P at 8 and ½ bytes means that eight bytes plus 4 bits from the (0,0) origin as shown in FIG. 9A. The ½ byte is into 4 bits from the most significant bit 7 in a byte and indicates the address starts at bit 3. Similarly, the ending address Q at 9 and ¼ bytes means that nine bytes plus 2 bits from the origin as shown in FIG. 9A, and the ¼ byte ends at bit 4. Thus, the first horizontal row of pixels in the selected portion to be cut out from the original image is specified by the relative offset addresses P and Q. Using P and Q, the first horizontal line containing the data "0330" is isolated. By the same token, the second through the fourth pixel rows of the desired portion are specified based upon pairs of addresses. Although the above example involves a single set of quaternarized data, for color representations, similar processes are repeated for each color component. During the above described image-processing operations, the approximated data allows faster and efficient data transfer and manipulations.

Figures 10A, 10B:
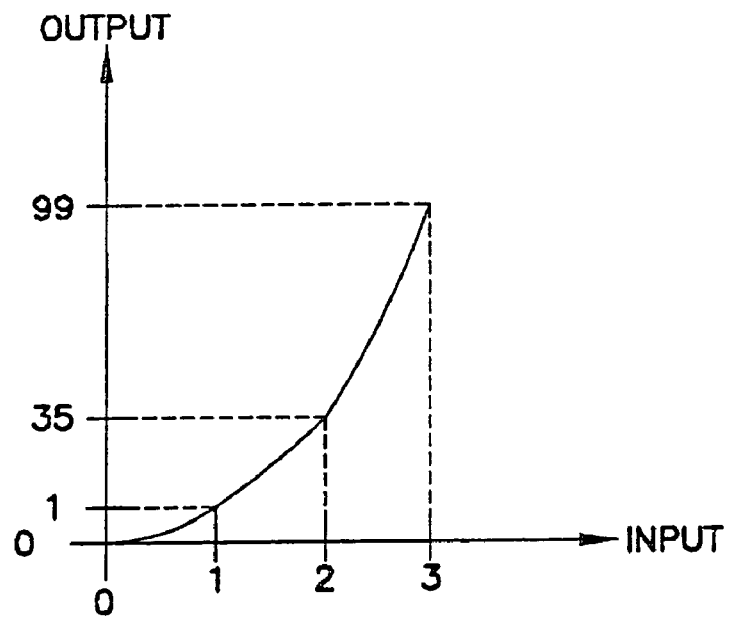
FIGS. 10A and 10B respectively show an exemplary function and a table used in the process for correcting intensity values or decompressing intensity values.

Now referring to FIGS. 10A and 10B, before the above described image-processed approximated data is outputted via an outputting unit, the intensity or density of the approximated data is corrected according to the output characteristics of the outputting unit. Assuming that the outputting unit such as a color printer has 100 gradations, according to the current invention, a gamma intensity correction unit 7 such as shown in FIG. 2 performs a uniform conversion of the quaternarized data to the predetermined gradation values ranging from 0 to 99 as shown in FIG. 10A. According to another preferred embodiment, the same conversion task is efficiently accomplished by a table-look-up process using a table as shown in FIG. 10B.

Figures 11D, 11E, 12:
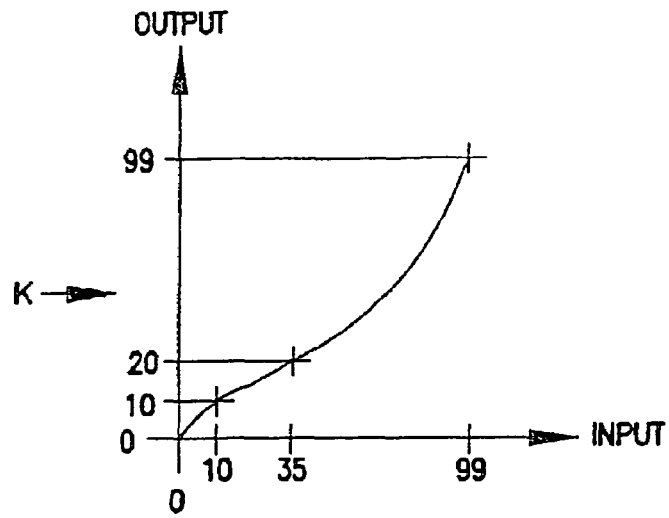

In addition to the above described density correction, referring to FIGS. 11A-11E, the color data is also corrected according to the output characteristics of the outputting unit prior to the image reproduction. Assuming that the outputting unit such as a color printer has 100 gradations, according to the current invention, a gamma chromaticity correction unit 8 such as shown in FIG. 2 performs the conversion of the quaternarized data to the predetermined gradation values ranging from 0 to 99 for cyan, magenta, yellow and black as respectively shown in FIGS. 11A-11D. Notice that each color component is uniquely converted based upon a different conversion curve. According to another preferred embodiment, the above described same conversion tasks are efficiently accomplished by table-look-up processes using a single color balance table for the color components as shown in FIG. 11E.

Additionally, referring to FIG. 12, the above color balance table as shown in FIG. 11E and the intensity table 10B are combined into one table. The above described conversion values are only exemplary and can be altered based upon the output characteristics of the printer and other factors. In the above discussion of the image-processing, the outputting unit such as a laser jet printer or an ink-jet printer is assumed to have a less gradation capability than the originally inputted data. For certain other high-gradation outputting devices such as thermal dye sublimation printers and silver halide printers, the above described compressed or approximated data needs to be decompressed to the original gradation level in order to take advantage of such high-gradation capabilities.

Lastly, referring to FIG. 13, the comparison in color image reproduction between a conventional digital copier and the above described preferred embodiment according to the current invention is summarized in a table format. For this comparison, the color image reproduction is performed at 400 dpi of the resolution, 256 gradation scale and 10 p.p.m. (pages per minute) using A-4 size paper. The compression or approximation is based upon a quaternary error diffusion method. Because of the reduced data processing amount, the processing speed in the preferred embodiment is approximately one fourth of that of the conventional digital copier in order to reproduce at 10 p.p.m. In other words, if the processing speed of the preferred embodiment is maintained at 10.3 MB/sec, the reproduction rate is improved.

The reproduction image quality of the preferred embodiment is also improved since the output stability is assured while the resolution is maintained as the same level.

In general, the current invention is applicable to improve color image data processing, gray scale image data processing and a combination of both during the image reproduction process. It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. An image processing apparatus, comprising:
    a reader module for inputting original image data including a pixel color value for each pixel represented by a first predetermined number of n bits in an original image, said reader module approximating the pixel color value into a second predetermined number of m bits while performing error diffusion so as to generate approximated color image data, the m bits being smaller than the n bits;
    a variable length encoder unit connected to said reader module for variably compressing the approximated color image data to generate further approximated color image data before transmitting the further approximated color image data;
    a variable length decoder unit connected to said variable length encoder for variably decompressing the further approximated color image data back to the approximated color image data so that each pixel is represented by the m bits; and an image processing/reproduction module connected to said variable length decoder for processing the approximated color image data for performing a combination of image processing, intensity correction and color correction so as to generate processed approximated color image data, said image processing/reproduction module outputting a reproduced image based upon said processed approximated color image data.

2. The image processing apparatus according to claim 1 wherein said reader module performs dithering for the error diffusion.

3. The image processing apparatus according to claim 1 wherein the image processing includes a combination of enlargement, reduction, color conversion for each of a predetermined set of primary colors.

4. The image processing apparatus according to claim 1 wherein the intensity correction is performed by a common gamma correction for all of a predetermined set of primary colors according to a conversion table.

5. The image processing apparatus according to claim 4 wherein the color correction is performed by a distinct correction for each of a predetermined set of primary colors according to a conversion table.

6. The image processing apparatus according to claim 5 wherein the conversion table is a single common table.

7. A method of image processing, comprising the steps of:
inputting original image data including a pixel color value for each pixel represented by a first predetermined number of n bits in an original image;
approximating the pixel color value into a second predetermined number of m bits while performing error diffusion so as to generate approximated color image data, the m bits being smaller than the n bits;
variably compressing the approximated color image data to generate further approximated color image data before transmitting the further approximated color image data;
transmitting the further approximated color image data from a first location to a second location;
receiving the further approximated color image data at the second location;
variably decompressing the further approximated color image data back to the approximated color image data so that each pixel is represented by the m bits;
processing the approximated color image data for performing a combination of image processing, intensity correction and color correction so as to generate processed approximated color image data; and
outputting a reproduced image based upon said processed approximated color image data.

8. The method of image processing according to claim 7 wherein said approximating step performs dithering for the error diffusion.

9. The method of image processing according to claim 7 wherein said image processing includes a combination of enlargement, reduction, color conversion for each of a predetermined set of primary colors.

10. The method of image processing according to claim 7 wherein the intensity correction is performed by a common gamma correction for all of a predetermined set of primary colors according to a conversion table.

11. The method of image processing according to claim 10 wherein the color correction is performed by a distinct correction for each of a predetermined set of primary colors according to a conversion table.

12. The method of image processing according to claim 11 wherein the conversion table is a single common table.

13. An image processing system, comprising:
a transmission side including;
a reader module for inputting original image data including a pixel color value for each pixel represented by a first predetermined number of n bits in an original image, said reader module approximating the pixel color value into a second predetermined number of m bits while performing error diffusion so as to generate approximated color image data, the m bits being smaller than the n bits;
a variable length encoder unit connected to said reader module for variably compressing the approximated color image data to generate further approximated color image data before transmitting the further approximated color image data; and
a reception side operationally connected to said transmission side including;
a variable length decoder unit for variably decompressing the further approximated color image data back to the approximated color image data so that each pixel is represented by the m bits; and
an image processing/reproduction module operationally connected to said variable length decoder unit for processing the approximated color image data for performing a combination of image processing, intensity correction and color correction so as to generate processed approximated color image data, said image processing/reproduction module outputting a reproduced image based upon said processed approximated color image data.

14. The image processing system according to claim 13 wherein said reader module performs dithering for the error diffusion.

15. The image processing system according to claim 13 wherein said image processing/reproduction module performs a combination of enlargement, reduction, color conversion for each of a predetermined set of primary colors.

16. The image processing system according to claim 13 wherein said image processing/reproduction module performs the intensity correction by a common gamma correction for all of a predetermined set of primary colors according to a conversion table.

17. The image processing system according to claim 16 wherein said image processing/reproduction module performs the color correction by a distinct correction for each of a predetermined set of primary colors according to a conversion table.

18. The image processing system according to claim 17 wherein the conversion table is a single common table.

* * * * *